United States Patent [19]

Watanabe et al.

[11] Patent Number: 4,772,438
[45] Date of Patent: Sep. 20, 1988

[54] METHOD AND APPARATUS FOR CONTINUOUS SHAPING OF CARBON-FIBER-REINFORCED PLASTIC TUBES

[75] Inventors: Takahiko Watanabe; Toshiyuki Sugano; Syu Yamashita; Kunihiko Murayama; Yasushi Yamamoto; Syohei Eto, all of Amagasaki, Japan

[73] Assignee: Itaru Todoriki, Tokyo, Japan

[21] Appl. No.: 29,961

[22] Filed: Mar. 25, 1987

[30] Foreign Application Priority Data

Apr. 17, 1986 [JP] Japan .................................. 61-87132

[51] Int. Cl.⁴ .............................................. B29C 35/10
[52] U.S. Cl. ....................................... 264/25; 156/180; 156/273.7; 156/441; 264/26; 264/27; 264/40.6; 264/103; 264/134; 264/137; 264/DIG. 65; 425/112; 425/174.6; 425/174.8 R; 425/215; 425/393
[58] Field of Search ................... 264/174, 103, 25, 26, 264/27, 137, 40.6, 134; 425/112–115, 215–217, 174.6, 174.8 R, 393, 95–98, 107, 215; 156/180, 273.7, 441

[56] References Cited

U.S. PATENT DOCUMENTS

| | | | |
|---|---|---|---|
| 3,185,747 | 5/1965 | Boggs | 425/112 |
| 3,497,413 | 2/1970 | Ullman et al. | 425/96 |
| 3,529,050 | 9/1970 | Smith | 425/112 |
| 3,530,212 | 9/1970 | Kienle et al. | 264/137 |
| 3,985,483 | 10/1976 | Clay et al. | 425/115 |
| 4,025,256 | 5/1977 | Heller | 425/115 |
| 4,087,222 | 5/1978 | Noel | 425/107 |
| 4,673,541 | 6/1987 | Watanabe et al. | 425/174.8 R |

*Primary Examiner*—Jeffery Thurlow
*Attorney, Agent, or Firm*—Oblon, Fisher, Spivak, McClelland & Maier

[57] ABSTRACT

In a method and apparatus for continuous shaping of carbon-fiber-reinforced plastic tubes, a carbon fiber prepreg in tape form impregnated with a first thermosetting resin is laminated on and around a mandrel; the laminate provided on said mandrel is preheated; and the preheated laminate is pulled in and through a hot die together with the mandrel, during which it is gelled, cured, and shaped into a carbon-fiber-reinforced plastic tube, wherein a second thermosetting resin is uniformly supplied onto the outer circumference of the laminate in a resin squeezing zone in the hot die.

4 Claims, 3 Drawing Sheets

METHOD AND APPARATUS FOR CONTINUOUS SHAPING OF CARBON-FIBER-REINFORCED PLASTIC TUBES

BACKGROUND OF THE INVENTION

1. Field of the Invention

This invention relates to a method and an apparatus for continuous shaping of a carbon-fiber-reinforced plastic tube (hereinbelow, referred to as a CFRP). More particularly, it is concerned with a method and an apparatus adapted to be used for continuous shaping of a CFRP having thin wall thickness, light weight, long length and high mechanical strength, such as those used for constructive members of a large-scaled aeronautic and space structure.

2. Discussion of Background

As the method for continuous shaping of lengthy shaped products having a definite cross-sectional configuration such as fiber-reinforced plastic (FRP) tubes, in which the reinforcing fibers are impregnated with a thermosetting resin to be made a matrix, there has been well known the pulling method, by which actual production of insulating tubes, anti-corrosive tubes, and so forth of a large wall thickness using glass fibers as the reinforcing material, has been done heretofore.

FIG. 4 of the accompanying drawing shows the basic concept of the conventional pulling method and apparatus, which has been quoted from an unexamined Japanese Patent Publication No. 58467/1976 concerning a shaped product of a pipe.

In the drawing, a reference numeral 1 designates a mat of reinforcing fibers which are delivered out of a plurality of bobbins; a numeral 2 refers to a mandrel fixedly held between a mat delivering part and a hot die; a numeral 3 refers to an impregnating means for forcibly impregnating a resin on a laminate formed on the outer circumference of the mandrel in a matrix form; a reference numeral 4 denotes a preheater for heating the laminate impregnated with the resin (for the heating means, radio-frequency wave is used in this embodiment); a numeral 5 refers to the hot die for curing and shaping the impregnated resin; a numeral 6 refers to a pull-out drive mechanism for grasping the shaped product and continously moving the same in the rightward direction; and a numeral 7 designates a plastic tube as a shaped product to be moved to the right by means of the pull-out drive mechanism 6:

Explaining the method of shaping the tube in this embodiment, the mat of reinforcing fibers 1 to be delivered out of the bobbins is put on the mandrel to form a laminate of the mat on the outer circumference of it. Then, a resin is forcibly impregnated in the laminate, thereby obtaining a preshaped product. Thereafter, this preshaped product is caused to pass through the preheater 4 to heat the same, then the surplus amount of the impregnating resin is removed by the hot die 5, and, at the same time, external configuration of the preshaped product is regularized. Following this, the resin is cured to thereby obtain a predetermined shaped product 7. In this case, the shaped product 7 is grasped by the pulling mechanism 6 to obtain a pulling force in the right direction. This pulling mechanism comprises two grasping devices and is capable of exerting continuous pulling force by alternately grasping the product by the two grasping devices.

While the above-described embgdiment is to impregnate the mat after laminated with the resin, an Unexamined Japanese Patent Publications No. 96067/1978 and No. 124/1981 disclose methods for pull-out shaping of hollow tubes, which comprises winding on and around a mandrel a fiber strand impregnated with a thermosetting resin, and thereafter subjecting the resin-impregnated fiber strand to the pull-out shaping by the mandrel.

In addition, there has been a report made by W. B. Goldworthy et al. in "The 36th (1981) Annual Society of Plastics, Session 15-F, pages 1 to 6" concerning a shaping method which is characterized in that the shaped product and the mandrel are moved together by the pulling mechanism having two units of the grasping device, although this method uses an oven type curing means.

These conventional shaping methods as described in the preceding, however, are not able to sufficiently cope with shaping of the carbon-fiber-reinforced plastic tubes of light weight, thin thickness and long length, to be used for the constructive members of, for example, a large-scaled space structure, taking advantage of the superiority in relative strength and relative modulus of elasticity of carbon fibers as the reinforcing material. In more detail, the shaped products for such purpose are required to have their ultimate weight reduction in relation to their requisite mechanical strength, for which a strength sustaining factor, for example, of the shaped product with respect to the theoretical value (to be represented by "ROM %" in terms of reduction in thickness to 1 mm or less and precision in shaping) has to be improved. However, these conventional shaping methods did not take this ROM % into account.

Such conventional pull-out shaping method is primarily to obtain with high efficiency a thick shaped product, in which glass fibers are used as the reinforcing material. Therefore, if and when such conventional technique is to be directly applied in the practice of the precision-shaping of a product having thin thickness of 1 mm or less, using the reinforcing fibers of high modulus of elasticity (i.e. the fibers which are brittle and easily breakable) such as carbon fibers, there would inevitably take place considerable decrease in the strength sustaining factor (ROM %) which is dependent on the state of the reinforcing fibers such as breakage and disturbance in orientation of the reinforcing fibers, uneven distribution of the fibers, etc.; a mixing ratio between the fibers and the resin; and further the uniform curing property of the resin, and so forth. As the consequence of this, the value of the strength sustaining factor, in the case of the high precision and high performance products for use in the space structure, becomes not only inneggligible, but also totally inadequate for shaping the carbon-fiber-reinforced plastic tubes having a wall thickness of 0.5 mm or less.

Describing this conventional shaping method for each and every process mechanism, there is, at first, a process step, in which the reinforcing fibers are delivered out of a bobbin stock in the form of fiber strand (hereinafter simply called "roving") and then the roving is wound on and around the mandrel after its being impregnated with a thermosetting resin, or the roving is impregnated with the resin after its being wound on and around the mandrel, following which they are forwarded to the subsequent preheating step. At any rate, the reinforcing fibers, in this case, come into direct contact with each of the process mechanism or are subjected to a forced bending. On account of this, when the carbon fiber is used as the reinforcing fibers, there tend to readily occur fuzzing (cracks in the fibers) and breakage of the fibers. Moreover, such resin impregnating means is difficult to control the fiber content $V_f$ (a volume fraction between the fibers and the resin), hence it is difficult to achieve the ultimate reduction in weight of the shaped product with respect to its required mechanical strength.

In addition, since a large number of bobbins are needed at the same time for supply of the reinforcing fibers in the form of roving, it is inevitable that a material feeding section of the process mechanism becomes large in its dimension and occupying area (space). Therefore, when such material feeding section is incorporated in the production line, there take place unavoidably various problems concerning the factory control, material control, and other managerial matters.

In the conventional curing and shaping step, a large amount of surplus thermosetting resin has to be removed, since this conventional method is primarily directed to obtain a thick shaped product in the main. For removal of such excess amount of resin, various measures were taken such that the squeezing angle in the squeezing section of the hot die for the curing and shaping process is made large, or multi-stage squeezing is carried out, which tends to cause the carbon fibers to be readily broken. In order to avoid the breakage of the carbon fibers, it is considered to reduce the squeezing angle. However, in a shaping method in which a large surplus amount of the resin has to be removed, resin removing efficiency will decrease. On the other hand, in a shaping method in which a small surplus amount of the resin is removed, there causes gellation of the resin staying in the squeezing section during shaping a long-sized product. This results in increase of viscosity and a reverse tension, which may cause the carbon fibers to be broken and reduction in the strength sustaining ratio (ROM %).

Incidentally, as the method for shaping such high performance carbon-fiber-reinforced plastic, in which more attention is paid to the strength sustaining factor (ROM %), there is a shaping method using a batch system which combines the filament winding and the autoclave curing. This method, however, is considerably inferior in its productivity for the large-scaled space structure, hence it cannot be adopted for the purpose of the present invention.

SUMMARY OF THE INVENTION

The present invention has been made with a view to solving the points of problem as described in the foregoing, and aims at providing a method and an apparatus for continuous shaping of carbon-fiber-reinforced plastic tubes of a thin wall thickness, according to which, by use of carbon fiber prepreg in tape form impregnated with a first thermosetting resin, breakage of the carbon fibers in the step of supplying the material and of laminating the prepreg on and around the mandrel can be prevented; the fiber content $V_f$ and the resin property can be made readily controllable; and further, by feeding a second thermosetting resin into a resin squeezing zone at the front half part of a hot die, gellation of the resin staying in the zone and breakage of the carbon fibers which may result by the gellation can be prevented.

According to the present invention, in one aspect of it, there is provided a method for continous shaping of carbon-fiber-reinforced plastic tubes, which comprises steps of, (a) a step of laminating a carbon fiber prepreg in tape form impregnated with a first thermosetting resin on and around a mandrel; (b) a step of preheating the laminate provided on the mandrel; and (c) a step of pulling the preheated laminate in and through a hot die together with the mandrel, during which it is gelled, cured, and shaped into the carbon-fiber-reinforced plastic tubes, wherein, the step (c) includes at least one of a resin squeezing step and a resin gelling step, and a second thermosetting resin is uniformly supplied onto the outer circumference of the laminate during the resin squeezing step.

According to the present invention, in other aspect of it, there is provided an apparatus for continuous shaping of carbon-fiber-reinforced plastic tubes, which comprises in combination of (a) means for laminating on a mandrel a carbon fiber prepreg in tap form impregnated with a first thermosetting resin; (b) means for preheating the prepreg laminated on and around the mandrel; (c) a hot die; (d) a pull-out drive means in association with a hot die to pull out the preheated prepreg together with the mandrel for gelling and curing the prepreg to thereby shape the same into the carbon-fiber-reinforced plastic tube, the hot die comprising at least one of a resin squeezing zone and a resin gelling zone, and (e) means for supplying a second thermosetting resin to the resin squeezing zone.

BRIEF DESCRIPTION OF THE DRAWINGS

The foregoing objects, other objects, advantages, and features of the present invention will become more readily apparent and understandable from consideration of the following detailed description thereof, especially when taken in conjunction with the accompanying drawings.

In the drawing.

DETAILED DESCRIPTION OF PREFERRED EMBODIMENT

In the following, the present invention will be described in detail with reference to a preferred embodiment thereof as shown in the accompanying drawing.

Figure 1:
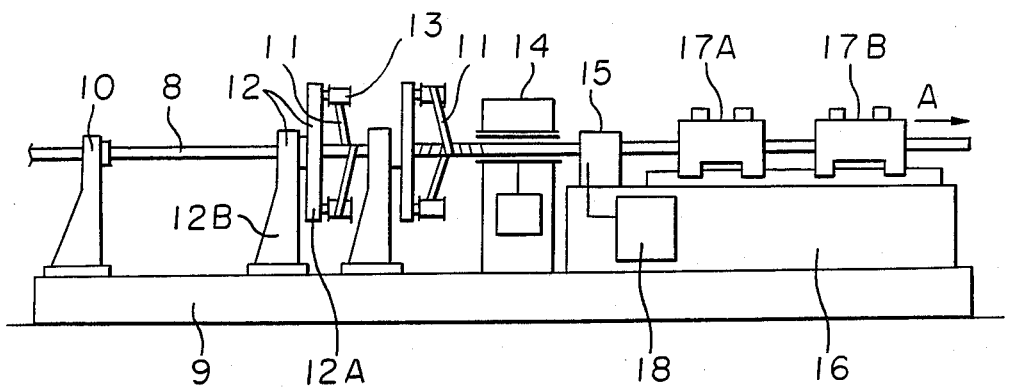
FIG. 1 is a side elevational view showing a general construction of an apparatus, which is for explaining the method for continuous shaping of carbon-fiber-reinforced plastic tube according to the embodiment of this invention.

Referring to FIG. 1, a reference numeral 8 designates a mandrel which is held on a mandrel support 10 fixed on a base 9 in a manner freely movable in the longitudinal direction. A numeral 11 refers to a carbon fiber prepreg tape (hereinbelow, referred to as CF) which is delivered from bobbins 13, 13 fitted onto shafts fixed on a ring winder 12 and held thereon in a rotatable manner, and is wound on and around the mandrel 8. The boss part of a rotational ring 12A of the ring winder 12 is rotatably supported by the bearing housed in a rotating ring support 12B. The rotational ring 12A itself is rotated by an ordinary drive means such as an electric motor, speed reduction gears, and so forth (not shown in the drawing). At the center of the boss part of the rotational ring 12A, there is formed a hole having a diameter sufficiently larger than that of the mandrel 8, into and through which the mandrel passes. A reference numeral 14 denotes a high frequency preheater, and a numeral 15 refers to a hot die fixed on a stand 16 which, in turn, is fixed on the base 9. Reference numerals 17A and 17B designate respectively the first and the second grasping mechanisms to grip a shaped product and pull the same in the direction of an arrow mark A. The carbon fiber prepreg tape wound on and around the mandrel 8 is gelled and cured, while it is passing through the hot die 15, and is finally shaped into the carbon-fiber-reinforced plastic shaped product. A numeral 18 designates a resin feeding means which heats a thermosetting resin at a predetermined temperature and feeds the resin into a resin squeezing zone 15A formed at the front half part of the hot die 15.

Figure 2:
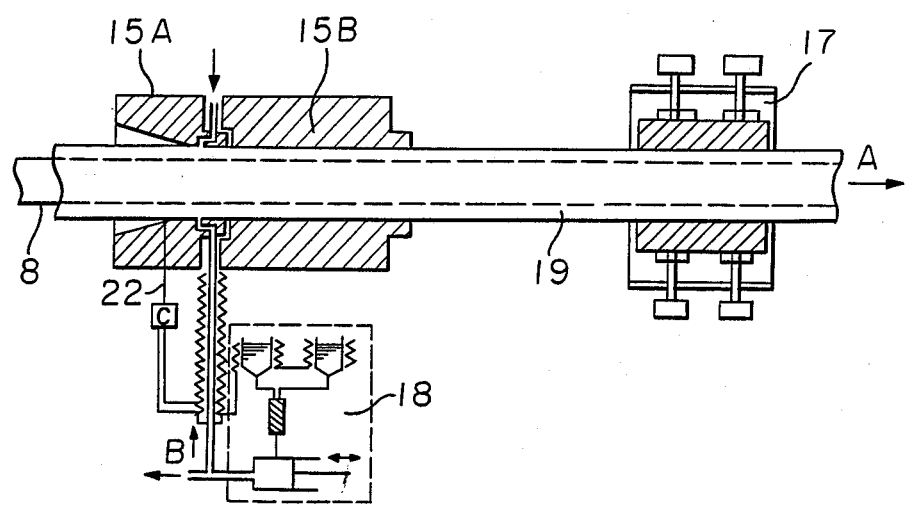
FIG. 2 is an enlarged, longitudinal cross-sectional view showing a structure of the hot die and the grasping mechanism.
Figure 3:
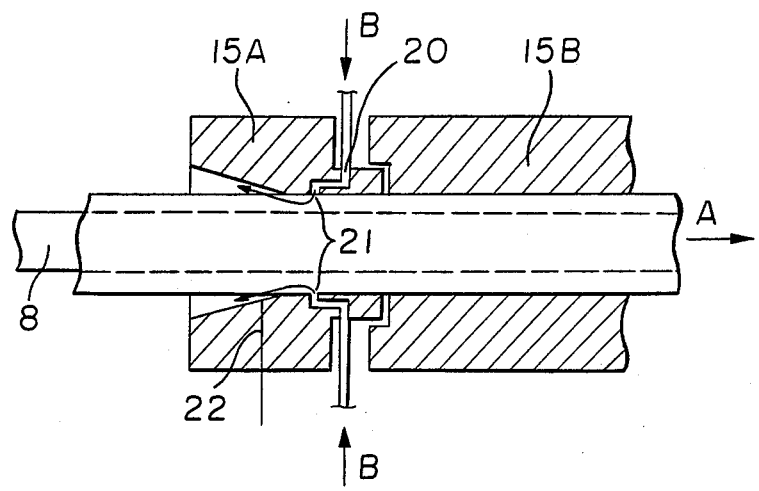
FIG. 3 is an enlarged, longitudinal cross-sectional view showing in more detail a part of the hot die shown in FIG. 2.
Figure 4:
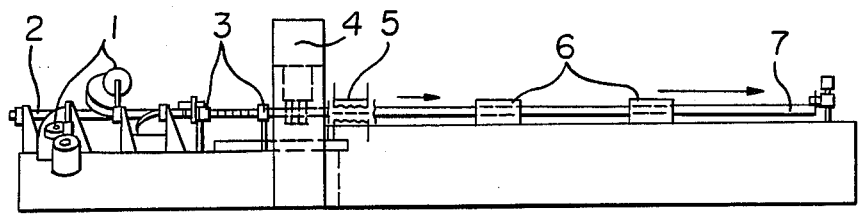
FIG. 4 is a schematic conceptual diagram of a conventional pull-out shaping method and an apparatus for practice of such method.

Referring now to FIGS. 2 and 3, a reference numeral 19 designates a shaped product, a numeral 15A refers to the resin squeezing zone, 15B a resin gelling zone, and 20 a piping circuit connected to the resin feeding means 18. An arrow mark B indicates a flowing direction of the thermosetting resin.

Figure 5:
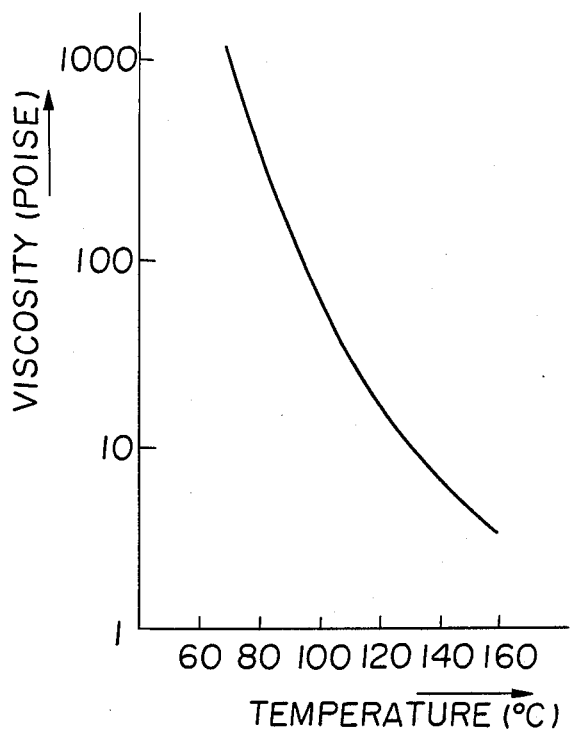
FIG. 5 is a characteristic diagram showing the relation between the viscosity and the temperature of a thermosetting resin used for a carbon fiber prepreg tape.

A numeral 22 designates a temperature adjusting means for adjusting the temperature of the thermosetting resin supplied to the hot die and the surplus resin squeezed by the squeezing action in the squeezing zone. The temperature adjusting means comprises temperature sensors, a heater, a temperature controller etc. One of the temperature sensors is embedded in the resin squeezing zone of the hot die to detect the temperature of the surplus resin. A preset temperature in the range of 0° C. to +5° C. is determined for the detected temperature and the temperature controller controls the temperature of the resin to be supplied through a resin supplying means including a piping system in which the heater is provided. In FIG. 5, the abscissa represents the temperature of the resin (unit: ° C.) and the ordinate represents the viscosity of the resin (unit: poise).

In the following, explanations will be given as to the shaping method and the apparatus to be used for the practice of such shaping method, according to the present invention. In this practical embodiment, the carbon fiber prepreg tape 11 is used as the constituent material for the carbon-fiber-reinforced plastic. Each of the bobbins 13 loaded with the carbon fiber prepreg tape 11 (for example, "TORAYCA P405" - a tradename for a product of Toray Kabushiki Kaisha, Japan) is mounted on the ring winder 12. The carbon fiber prepreg tape 11 delivered from the bobbin 13 by rotation of this ring winder 12, i.e., the rotational ring 12A around the mandrel 8 passing through the center, while applying a predetermined back tension to the bobbin 13, is wound on and around the mandrel 8. In this case, the rotational speed of the ring winder 12 is made synchronous with the moving speed of the two grasping mechanisms 17A and 17B so as to control the tape winding speed. Also, an angle for winding the tape 11 may be arbitrarily selected in accordance with a width of the prepreg tape to be used and a fitting angle of the bobbins 13.

In this way, use of the carbon fiber prepreg tape minimizes fuzzing and breakage of the brittle carbon fibers owing to the resin layer, through which the fibers are subjected to bending action or brought into contact with each and every constituent mechanism. Further, since the carbon fiber prepreg is primarily at a predetermined level of the carbon fiber content $V_f$ and the curing, and also, since the fibers are in the uniformly orient arrangement, the squeezing condition and the curing condition of the resin can be easily controlled and the fiber content $V_f$ can be easily adjusted at the time of its curing and shaping, which makes it possible to suppress the uneven distribution and disturbance in the orientation of the carbon fibers to the minimum possible degree.

The carbon fiber prepreg tape 11 as wound on and around the mandrel 8 moves rightward in FIG. 1 by the pulling force from the two grasping mechanisms 17A and 17B, in the course of which it passes through the high frequency preheater 14. The high frequency preheater 14 is to supply a high frequency field in the frequency band of from 10 to 50 KHz, with which the mandrel 8 alone made of the magnetic material generates heat by the principle of the induction heat, whereby the carbon fiber prepreg tape 11 becomes indirectly preheated. Incidentally, this high frequency preheater 14 should preferably have its capability or readily and arbitrarily adjusting its output in order to cope with varying factors such as quality of the material constituting the mandrel, heat discharge, and others.

In the case of the temperature control for such mandrel having a large heat capacity, as it is least affected by the environmental changes, this indirect preheating system for the carbon fiber prepreg tape provides easy control of every control condition at the time of curing and shaping, i.e., the viscosity adjusting condition of the resin at the time of the squeezing which depends on temperature, the curing condition, and so forth, hence a stable shaping condition becomes readily obtainable.

The carbon fiber prepreg tape 11 which has been preheated by the high frequency preheater 14 then passes through the subsequent hot die 15 together with the mandrel 8 and shaped under the pulling force. The hot die 15 comprises the resin squeezing zone 15A and the resin gelling zone 15B, each of the zones being separately and independently regulated its temperature.

A plurality of discharge apertures or discharge channels in a ring form are formed near the joining point between a tapered portion and a flat portion in the resin squeezing zone 15A so as to be along the inner circumferences, the discharge apertures or the discharge channels are connected to the resin feeding means 18 through the piping circuit 20. The hot die 15 is splitable in two halves along the sectional plane parallel to the axis of it so as to facilitate dismantling for overhall and cleaning after the shaping operations. The fiber carbon prepreg 11 is once rendered fluid by heat during its passing through the resin squeezing zone 15A to remove the surplus resin by the squeezing action, and, at the same time, the prepreg is subjected to regulation of the overall configuration at the flat portion 15D, while the fibers are subjected to parallel arrangement, after which the prepreg is forwarded to the subsequent resin gelling zone 15B to be cured.

A fresh thermosetting resin is forcibly supplied to the resin squeezing zone through the discharge apertures 21 or the discharge channels 21. Accordingly, a surplus amount of the thermosetting resin is effectively removed by the squeezing function which is effected at or near the squeezing zone, whereby the surplus resin flows to the inlet side of the squeezing zone. When the fresh resin is to be fed, the temperature of the resin is made equal to or higher than that of the squeezed resin to thereby avoid increase in viscosity. Viscosity of a resin generally shows a strong temperature dependency. For instance, according to the temperature characteristic of the thermosetting resin (TRAYCA P405) for the prepreg tape, temperature reduction of 5° C. at around 100° C. increases viscosity of about 30 poise as shown in FIG. 5. Namely, the increased viscosity causes disturbance in orientation and the breakage of the carbon fibers when the resin having a low temperature is supplied. Although the breakage of the carbon fibers can be prevented by reducing the squeezing angle in the resin squeezing zone 15A, a smooth discharge of the surplus resin cannot be obtained and gellation of the resin is easily caused. However, in the present invention, by feeding the fresh resin having a controlled temperature, the gellation of the surplus resin is prevented. Accordingly, there is no increase in the back tension due to the gellation of the resin in the resin squeezing zone, which makes it possible to continously obtain the carbon-fiber-reinforced plastic tubes of thin wall thickness and being less liable to decrease its strength sustaining factor (ROM %) to derive from breakage and disturbance in the orientation of the fibers.

As an example of shaping the plastic tube, the mandrel to be used has a length of 2 meters per piece, a plurality of such mandrels are connected with screw and nuts at their adjacent ends to be formed into a continuous length. The carbon-fiber-reinforced plastic tube as shaped, covering the mandrel, is cut in conformity to the unit length (2 meters) of the mandrel, after which the mandrel of the unit length is separated from the adjacent mandrels by unscrewing, thereafter the shaped carbon-fiber-reinforced plastic tube covering the mandrel is removed therefrom.

In the above-described embodiment of the present invention, the lamination of the prepreg tape on and around the mandrel has been explained in the case where it is wound in the peripheral direction by the ring winder unit. It is however possible that the shaped article with increased length in the axial direction is obtained by incorporation of a parallel arranging unit for the purpose of increasing the strength in the axial direction. Furthermore, by varying the arrangement of each unit, there can be obtained the shaped product having an arbitrary laminar structure.

Figure 6:
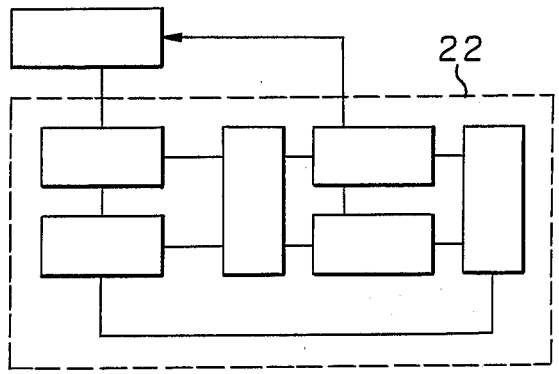
FIG. 6 is a block diagram of an embodiment of a system for adjusting the temperature of the thermosetting resin to be supplied to a hot die and the surplus resin produced by a squeezing action.

The resin feeding means for supplying the thermosetting resin into the resin squeezing zone preferably has a temperature adjusting means for adjusting the temperature of the resin as shown in FIG. 6, which functions to directly detect the temperature of the surplus amount of squeezed resin remaining in the squeezing zone and performs temperature adjustment to the fresh thermosetting resin stored in the resin feeding means.

As has been explained in the foregoing, the present invention is so constructed that the carbon fiber prepreg tape impregnated with the thermosetting resin is laminated on and around the mandrel, then the laminated body on the above-mentioned mandrel is preheated, thereafter the preheated laminate is pulled in and through the hot die along with the above-mentioned mandrel, during which the thermosetting resin is gelled, cured, and shaped into the carbon-fiber-reinforced plastic tube. With such construction according to the present invention, breakage of the carbon fibers during the steps of the material supply and of laminating the prepreg tape on and around the mandrel can be prevented, and the fiber content $V_f$ and the resin property can be made readily controllable.

Further, when the prepreg is preheated indirectly by the induction heating of the mandrel made of a magnetic material, there is no heat discharging phenomenon to the mandrel having a large heat capacity as in the conventional apparatus, hence the temperature control at the time of the curing and shaping can be done with good precision. As the result of this, lowering in the strength sustaining factor (ROM %) to take place in inter-relationship with the temperature control from melting to curing of the resin, the uneven distribution of the carbon fiber, to be derived from breakage and disturbance in the orientation of the carbon fibers can be kept minimum In addition, since the fresh thermosetting resin is forcibly supplied into the squeezing zone of the hot die, the surplus resin squeezed from the prepreg laminate body is effectively removed and the breakage and the disturbance in the orientation of the carbon fibers due to the gellation of the resin staying in the squeezing zone are prevented. As a result of this, carbon-fiber-reinforced plastic tubes of a thin wall thickness, e.g. 10 mm or less can be easily shaped.

In the foregoing, the present invention has been described with particular reference to a preferred embodiment thereof as illustrated in the accompanying drawing. It should however be noted that the embodiment is illustrative only and not so restrictive, and that changes and modifications may be made by those persons skilled in the art without departing from the spirit and scope of the invention as recited in the appended claims.

What is claimed is:

1. A method for continuous shaping of carbon-fiber-reinforced plastic tubes, which comprises:
    (a) a step of laminating a carbon fiber prepreg in tape form impregnated with first thermosetting resin on and around a mandrel;
    (b) a step of preheating said laminate provided on said mandrel; and
    (c) a step of pulling said preheated laminate in and through a hot die together with said mandrel, during which it is gelled, cured, and shaped into the carbon-fiber-reinforced plastic tubes, wherein,
    said step (c) includes at least one of a resin squeezing step and a resin gelling step, and
    a second thermosetting resin is uniformly supplied onto the outer circumference of said laminate during said resin squeezing step.

2. The method for continuous shaping of carbon-fiber-reinforced plastic tubes according to claim 1, wherein the temperature of said second thermosetting resin to be supplied during said resin squeezing step is adjusted to be the same as or higher than that of a surplus amount of the first thermosetting resin squeezed from said laminate of the carbon-fiber-reinforced prepreg during said resin squeezing step.

3. An apparatus for continuous shaping of carbon-fiber-reinforced plastic tubes, which comprises in combination:
    (a) means for laminating on a mandrel a carbon fiber prepreg in tape form impregnated with a first thermosetting resin;

(b) means for preheating said prepreg laminated on and around said mandrel;

(c) a hot die;

(d) a pull-out drive means in association with a hot die to pull out said preheated prepreg together with said mandrel for gelling and curing the prepreg to thereby shape the same into the carbon-fiber-reinforced plastic tube, said hot die comprising at least one of a resin squeezing zone and a resin gelling zone, and (e) means for supplying a second thermosetting resin to said resin squeezing zone.

4. The apparatus for continuous shaping of carbon-fiber-reinforced plastic tube according to claim 3, which comprises a resin feeding means which adjusts the temperature of said second thermosetting resin supplied to said resin squeezing zone to be the same as or higher than that of a surplus amount of said first thermosetting resin which is produced from said laminate of carbon-fiber-reinforced prepreg by squeezing the same at said resin squeezing zone.

* * * * *